A. S. GEAR.
Machines for Cutting Stone.
No. 135,642.      Patented Feb. 11, 1873.
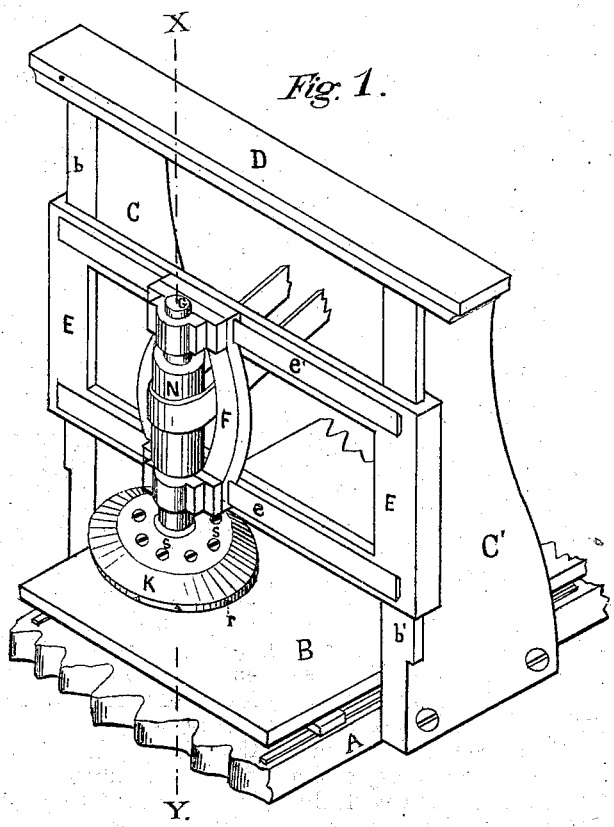
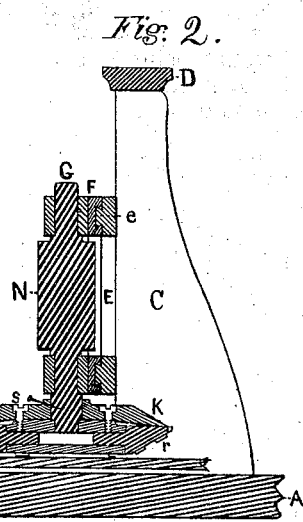
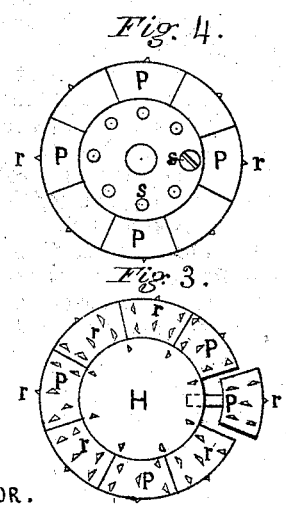
WITNESSES.
C. E. Breck
George E. Carter
INVENTOR.
Alonzo S. Gear
per Sylvenus Walker
Atty.

UNITED STATES PATENT OFFICE.

ALONZO S. GEAR, OF BOSTON, MASSACHUSETTS.

IMPROVEMENT IN MACHINES FOR CUTTING STONES.

Specification forming part of Letters Patent No. 135,642, dated February 11, 1873.

*To all whom it may concern:*

Be it known that I, ALONZO S. GEAR, of Boston, in the county of Suffolk and State of Massachusetts, have invented certain Improvements in Stone-Cutting Machines, of which the following is a specification:

The first part of my invention relates to a rotary cutter-head studded with diamonds for cutting or surfacing stone; and consists principally in the combination of such rotary cutter-head with adjustable mechanism for moving the same vertically and laterally, and the carrying bed for feeding the stone to be cut. It consists also in constructing such head with an outer rim composed of a series of sections forming a continuous rim, each section being held in position independent of the others by means of set-screws, connecting them permanently to the hub of such cutter-shaft; also, in beveling of such sectional rim upon its diamond-studded surface toward its periphery. It further consists in the combination of a chilled cast-iron beveled disk or rotary wedge with a rotary cutter-head studded with diamonds. The object of such disk or rotary wedge is, when the rotary cutter-head has cut under a projecting portion of stone a little, the beveled disk or rotary wedge coming in contact with the inner surface of such a projection will chip or break it off instead of requiring it to be reduced to powder or dust by the cutting-surface of such head.

The object of constructing the rotary cutter-head in sections is, in case any of the diamonds become loose or broken, such section may be easily removed, and its place filled by another ready set with diamonds without the necessity of removing the whole cutter-head. By means of the bevel-surface the rotary cutter-head acts upon the stone, gradually cutting away the same by each succeeding series of diamonds, as it advances beneath the cutter-head. When desirable the bottom of the hub may be studded with diamonds, so as to further smooth the stone cut by the diamonds in the beveled portion of the cutter-head.

The stone to be cut is placed upon a moving bed and fastened thereto by adjustable clamps or dogs. As the bed advances, carrying the stone, the diamonds upon the periphery of the rotary cutter-head cut into the stone beneath the highest projections to be smoothed off; then the beveled edge of the rotary wedge comes in contact beneath such projections and chips or breaks them off; then the diamonds upon the beveled surface cut away the remaining irregularities and the stone passes beneath the hub of the cutter, whose diamonds finish and smooth the stone to a perfect level or even surface. The cutter-head should be run at a high rate of speed, say four thousand revolutions per minute. This bed is moved beneath the revolving cutter-head in similar manner to the means usually employed to effect this purpose in the common well-known "Daniel's planer," or the iron planer in common use. I also effect the movements of the rotary cutter-head, both laterally and vertically, by the means usually employed for such purpose, either a screw-shaft or rack and gear connected with a hand-crank similar to those employed for moving the cutter in a common iron planer.

Figure 1 is a perspective view of my invention. Fig. 2 is a vertical central section as indicated by dotted lines $x\,y$ in Fig. 1. Fig. 3 is a plan view of a rotary cutter-head studded with diamonds, showing the cutting-surface, one section being removed. Fig. 4 is a view of the top side of the cutter-head, the rotary wedge being removed.

A is the frame of the machine, which frame should be substantially constructed to resist the vibrations of the operative parts. B is the bed, provided with T-shaped grooves to hold adjustable clamps or dogs, which confine the stone to the bed while being cut. N is a pulley connected to the vertical cutter-shaft G, which receives motion from a horizontal drum by a one-fourth-twist belt. C C' are two upright standards, which are connected to the frame A in a permanent manner. D is a cross-piece connected to the tops of the standards. E is a cross-frame, sliding up or down in guides $b\,b'$ upon the standards C C'. This frame is adjusted vertically by means of a screw-shaft or rack and gear operated by a hand-crank. F is an adjustable frame, connected to the former one by dovetailed guides $e\,e'$ upon the top and bottom of the same, which fit into corresponding grooves in the other, and is adjusted laterally, sliding back and forth across frame E by means of a rack and gear, or a screw-shaft connected to a hand-crank, such as is usually employed for such purpose. This frame F is provided at top and bottom with journal-boxes, into which is fitted shaft G, carrying hub H, to which is attached the sectional rim P P P by means of projections which fit into holes or openings in the hub H and are confined therein by set-screws S S S, or in any other preferred way. K is a chilled cast-iron disk or rotary wedge connected to shaft G by a set-screw. This disk or rotary wedge bears upon the top of the cutter-head, and is beveled off back from its periphery, which rests at about an eighth of an inch from the circumference of the cutter-head, where it terminates in an edge. The bevel is cut off on an angle of about forty-five degrees, both on the disk and cutter-head. These sectional rim-pieces may be constructed of steel and beveled off upon one side, leaving the periphery about an eighth of an inch in thickness. The beveled surface is studded with diamonds $r\ r\ r$, as shown in Fig. 3, so that each succeeding row or series shall cut deeper into the stone than the preceding ones until the stone is reduced sufficiently to pass beneath the hub H, which may be studded with diamonds, so as to further smooth off the surface of the stone. These diamonds are set in such manner that their action upon the stone has a tendency to press them back against their bearings; also, in such manner as to make a shearing or drawing cut.

It will be obvious that the rotary cutter-head may be run horizontally and act upon the side of the stone instead of on top, as above described, and that part of section rim-pieces may be omitted.

I have omitted to show and describe minutely some parts of the machine that are old and well known, confining the description and drawing in detail more particularly to those parts which are new.

Having thus described my invention, what I claim is—

1. The above-described rotary cutter-head studded with diamonds, in combination with adjustable mechanism for moving the same vertically and laterally and a movable carrying-bed for feeding the stone to be cut, substantially as set forth.

2. The rotary cutter-head, composed of shaft G, hub H, and sectional rim-pieces P P P studded with diamonds, having a beveled surface and connected to the hub by means of set-screws or their equivalents, substantially in the manner described, as and for the purposes set forth.

3. The chilled cast-iron rotary wedge or disk K, in combination with a rotary cutter-head studded with diamonds, substantially as and for the purposes set forth.

ALONZO S. GEAR.

Witnesses:
SYLVENUS WALKER,
L. W. BRADLEY.